US012264812B2

(12) United States Patent
de Montgrand et al.

(10) Patent No.: US 12,264,812 B2
(45) Date of Patent: Apr. 1, 2025

(54) PRODUCTION LAMP WITH REMOVEABLE LED MODULE

(71) Applicant: Rosco Laboratories, Inc., Stamford, CT (US)

(72) Inventors: Nils de Montgrand, Ecully (FR); Frederic Perry Phillips, Hangzhou (CN); David Guillet, Montluel (FR); Rèmi Barril, La Verpillière (FR)

(73) Assignee: Rosco Laboratories, Inc., Stamford, CT (US)

( * ) Notice: Subject to any disclaimer, the term of this patent is extended or adjusted under 35 U.S.C. 154(b) by 0 days.

(21) Appl. No.: 18/432,893

(22) Filed: Feb. 5, 2024

(65) Prior Publication Data

US 2024/0392962 A1 Nov. 28, 2024

Related U.S. Application Data

(60) Provisional application No. 63/504,575, filed on May 26, 2023.

(51) Int. Cl.

| | |
|---|---|
| ***F21V 29/58*** | (2015.01) |
| ***F21V 5/04*** | (2006.01) |
| ***F21V 23/06*** | (2006.01) |
| *F21Y 113/13* | (2016.01) |
| *F21Y 115/10* | (2016.01) |

(52) U.S. Cl.

CPC .............. *F21V 29/59* (2015.01); *F21V 5/045* (2013.01); *F21V 23/06* (2013.01); *F21Y 2113/13* (2016.08); *F21Y 2115/10* (2016.08)

(58) Field of Classification Search

CPC .......... F21V 29/59; F21V 5/045; F21V 23/06; F21Y 2113/13; F21Y 2115/10

See application file for complete search history.

(56) References Cited

U.S. PATENT DOCUMENTS

| | | | | |
|---|---|---|---|---|
| 11,566,781 | B1 * | 1/2023 | Dong | F21S 45/43 |
| 2006/0109649 | A1 | 5/2006 | Ducharme et al. | |
| 2007/0221797 | A1 * | 9/2007 | Thompson | F21V 21/06 248/176.1 |
| 2008/0175008 | A1 * | 7/2008 | Hu | F21V 29/89 362/373 |

(Continued)

OTHER PUBLICATIONS

International Search Report and Written Opinion of the International Searching Authority; Application No. PCT/US2024/030560; Completed: Sep. 12, 2024; Mailing Date: Oct. 8, 2024; 19 Pages.

*Primary Examiner* — Evan P Dzierzynski

(74) *Attorney, Agent, or Firm* — Whitmyer IP Group LLC

(57) ABSTRACT

A production lamp is provided with a removeable lighting module. The removeable lighting module includes an array of LEDs mounted to a plate. A cooling module circulates fluid through a plate behind the array of LEDs to dissipate heat. A driver module generates variable signals to power each of the LEDs in the array to create myriad color output of highly variable intensity. Dripless fluid connectors mounted to the plate connect the cooling module in fluid communication with the plate. Movable pins mounted in the plate electrically connect the LED array to the driver module. Finally, a tool-less actuator mounted in the removeable lighting module disconnects both the dripless connectors and the pins for removal and replacement of the LED module.

33 Claims, 7 Drawing Sheets

(56) References Cited

U.S. PATENT DOCUMENTS

| | | | | |
|---|---|---|---|---|
| 2011/0012518 | A1* | 1/2011 | Tarter | F21L 4/027 315/160 |
| 2012/0106177 | A1* | 5/2012 | Blankestijn | F21V 29/70 362/382 |
| 2014/0313744 | A1 | 10/2014 | Collias | |
| 2015/0062862 | A1 | 3/2015 | Baxter et al. | |
| 2019/0003657 | A1* | 1/2019 | Gross | F21L 4/02 |

* cited by examiner

SECTION A-A

PRODUCTION LAMP WITH REMOVEABLE LED MODULE

TECHNICAL FIELD

The invention relates to production lamps having an array of LEDs, and more particularly to production lamps having removeable, replaceable LED modules.

BACKGROUND

Traditional production lamps for use in stage and theater have sodium bulbs mounted in a tube-like housing that includes a lens package for focusing and patterning the light. The housings are commonly mounted on pipe structures built on tripods or into stage and theater facilities. Color slides called gels are used to alter the color of the mostly white light generated by the sodium bulbs. For environmental and other reasons, retrofit structures with an array of LEDs have begun to replace sodium bulbs in production lights.

One disadvantage of these LED bulbs is that they continue to require color gels. Another disadvantage is that the white light is generated at a different color temperature than the sodium bulbs such that the color light generated by the LED and gel combinations varies from the color light generated by gel and sodium bulb combinations. A further disadvantage is that the LEDs fade and color drift over time, exacerbating the color matching issue and adding an intensity issue.

Production lamps also generate lots of heat. Cooling the lights is an important aspect of production lamp design because it can significantly extend the usable life of lights used in the lamps. There are many examples of vented housings, fans, heat sinks and even liquid cooling systems used in lights. See, e.g., U.S. Pat. No. 9,404,648 which discloses a variety of cooling techniques, including circulating cooling fluid around heat sink fins. The most effective cooling strategies make it particularly difficult to replace LED or other lights used in production lamps to meet the fade and drift quality issues.

SUMMARY

Accordingly, it is an object of the invention to provide a production lamp with a removable, replaceable LED lighting module.

It is another object of the invention to provide a production lamp with an LED lighting module capable of producing virtually any color output.

A further object of the invention is to provide a production lamp having a focusable LED output using a Fresnel lens.

Still another object of the invention is to provide a liquid-cooled production lamp with a removable lighting module.

Still a further object of the invention is to provide a production lamp in which the cooling, electrical and mechanical connection of the lighting module all can be actuated with a single motion.

DETAILED DESCRIPTION

It is understood that the following description, with reference to the above-described figures, depicts a structure according to the invention but that this particular structure is merely an example and in no way limits the scope of the invention. Indeed, one of ordinary skill in the art could incorporate the teachings of the invention into many other particular structures within the scope of the claims.

Figure 1A:
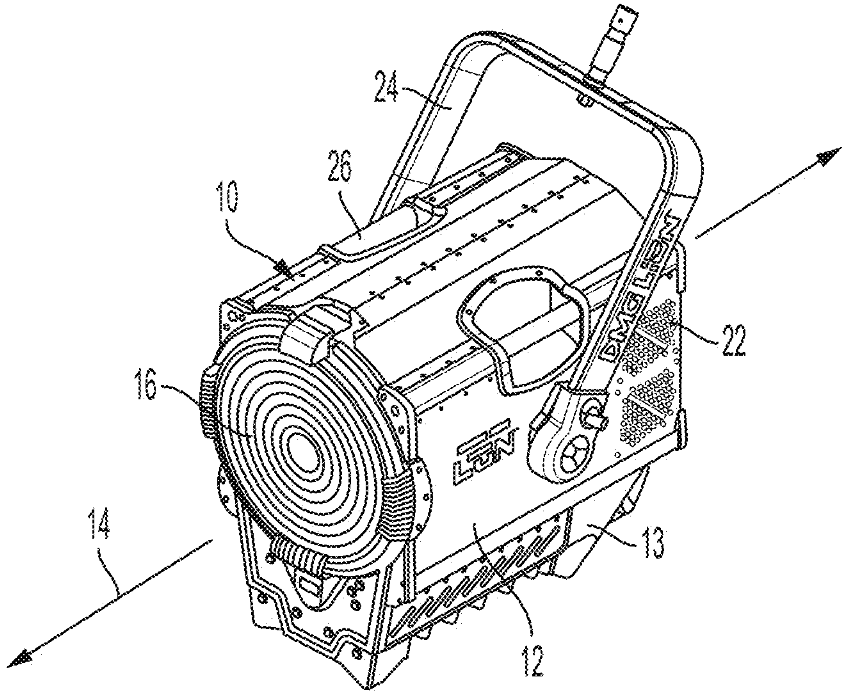
FIG. 1A is a front isometric view of a lamp, according to the invention.
Figure 1B:
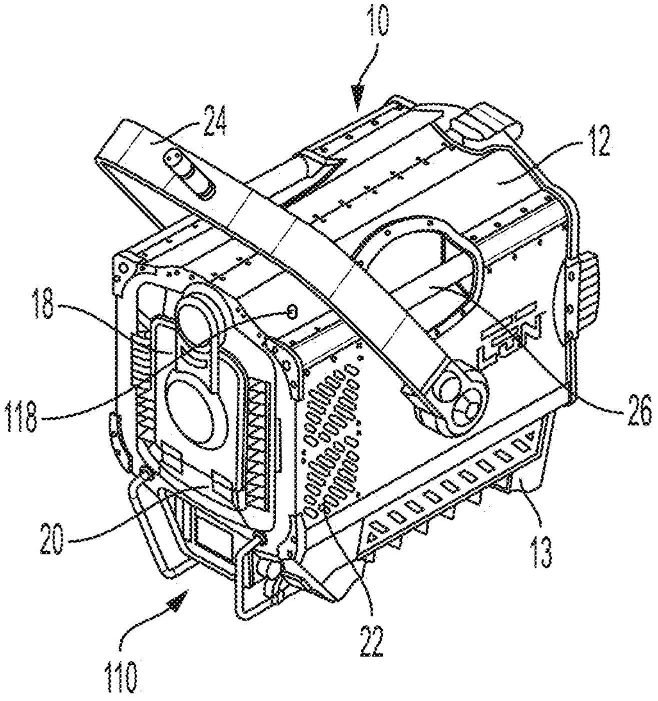
FIG. 1B is a rear isometric view of a lamp, according to the invention.

Referring first to FIGS. 1A-1B, lamp 10 is depicted in front and rear isometric views. Lamp 10 includes a generally tubular housing 12 extending along an axis 14. Fresnel lens 16 is fixed at a front end of housing 12, and an access door 18 is located at a rear end of housing 12. Access door 18 opens via hinges 20 to expose the lighting module and trolley structure (not shown in these figures).

Housing 12 features vents 22 located in a region of lamp 10 near the lighting module. A rotatable mounting bracket 24 can be used to mount lamp 10 to stages, tripods and the like in conventional fashion. For this purpose, hand grips 26 are provided for transporting and positioning lamp 10.

A lower portion 13 of housing 12 includes internal electronic components and a rail system for moving the trolley structure (see FIGS. 2A-2B) along axis 14 to focus light from the LED array (see FIG. 3A) from a flood pattern to a spot pattern via Fresnel lens 16. The housing 12 also includes a control unit 110, which is further described with reference to FIG. 7.

Figure 2A:
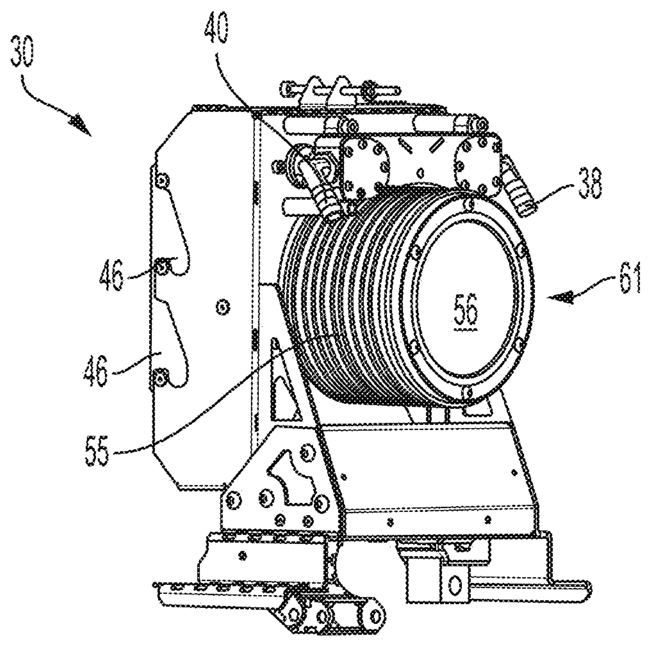
FIG. 2A is a front isometric view of a lighting module trolley for use in the lamp of FIGS. 1A-1B, showing a color mixer, hydraulic connectors, and toothed brackets for engagement with pinions for moving the trolley within the lamp.
Figure 2B:
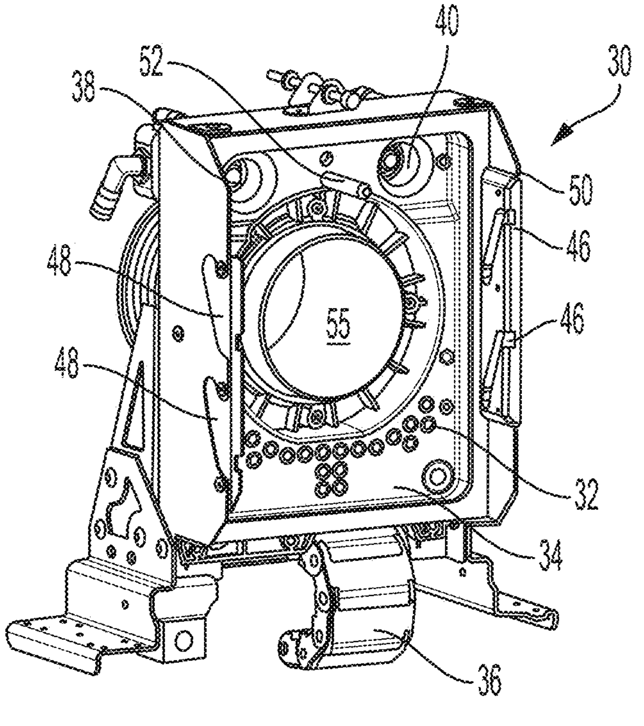
FIG. 2B is a rear isometric view of a lighting module trolley mounted for axial movement in the production lamp of FIGS. 1A-1B and depicting the electrical connection pins and locking cam raceways for receiving lighting module pins.

Turning now to FIGS. 2A-2B, a trolley 30 is shown in front and rear isometric views. Trolley 30 is mounted within housing 12 for motion along axis 14 to bring the LED array toward and away from Fresnel lens 16. Trolley 30 enables electrical, mechanical, and fluid connection to a removeable lighting module (see FIGS. 3-5).

Electrical connection is accomplished by a plurality of pogo pins 32 or the like mounted on circuit board 34, with a wiring harness leading from circuit board 34 through passage 36 to lower portion 13 of housing 12 where a power connection (not shown) and control logic is contained. The control logic may advantageously incorporate a wireless transceiver for remote control of production lamp 10.

A fluid connection is used for liquid cooling in lamp 10, and that is achieved in trolley 30 via inlet/outlet 38/40 which are mated to dripless connectors (see FIG. 5) when the lighting module is assembled to trolley 30.

Trolley 30 includes two pairs of cam raceways 46/48. Mounting pins 64/66 enter the raceways at rear edge 50 of trolley 30 and as they respectively follow the raceways inwardly. Upon actuation, the follower pins cam the lighting module inwardly and mechanically lock it in place after driplessly connecting the fluid cooling lines at 38/40 and electrically connecting the pogo pins (or other known electrical connectors) at 32. One or more elongated guide pins 52 may provide axial alignment to the camming action ensuring proper liquid and electrical connection.

Figure 3A:
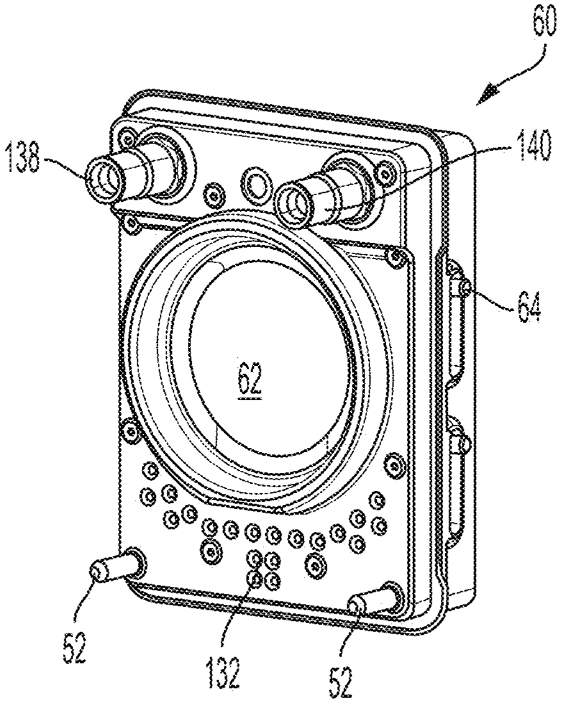
FIG. 3A is a front elevation view of a removeable lighting module for use in the production lamp of FIGS. 1A-1B, showing an LED array, electrical and hydraulic connectors, guide pins, and locking pins or latches in the position in which the lighting module would be locked into the trolley depicted in FIGS. 2A-2B.
Figure 3B:
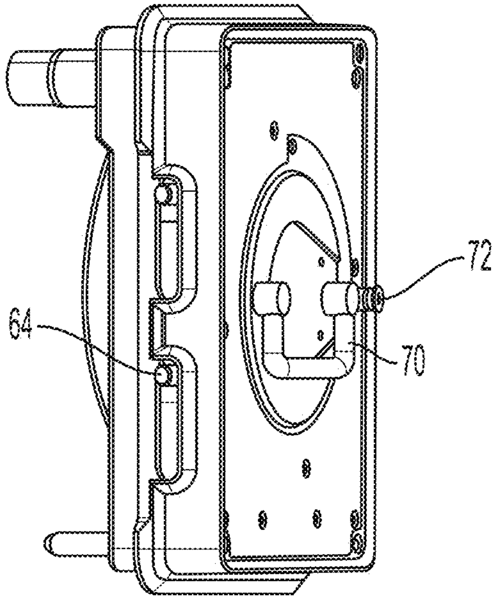
FIG. 3B is a rear elevation view of a removeable lighting module for use in the production lamp of FIGS. 1A-1B, depicting an actuator and locking pins or latches in the position in which the lighting module would be locked into the trolley depicted in FIGS. 2A-2B.

Turning to FIG. 3A and FIG. 3B, the lighting module 60 has one or more arrays of light-emitting diodes (LEDs) 62 that are mounted in a body of the lighting module. For example, the lighting module 60 may include a first array of LEDs of a first color, a second array of LEDs of a second color, a third array of LEDs of a third color, etc. In some embodiments, the lighting module 60 may include four, five, six, or more different colors of LEDs. The lighting module 60 also includes electrical connectors 132 that are connected within the body of the lighting module to junctions (not shown) of the LEDs. Further, referring briefly to FIG. 6, the lighting module 60 has a cold plate 80 mounted to the back of the body such that an inner cavity 82 of the cold plate 80 is aligned with the junctions of the LEDs 62 for removing heat from the LED junctions. Cold plate fluid connectors 138, 140, which are connected in fluid communication with the inner cavity 82, protrude from the cold plate 80 through the body to a front side of the lighting module 60.

Figure 4:
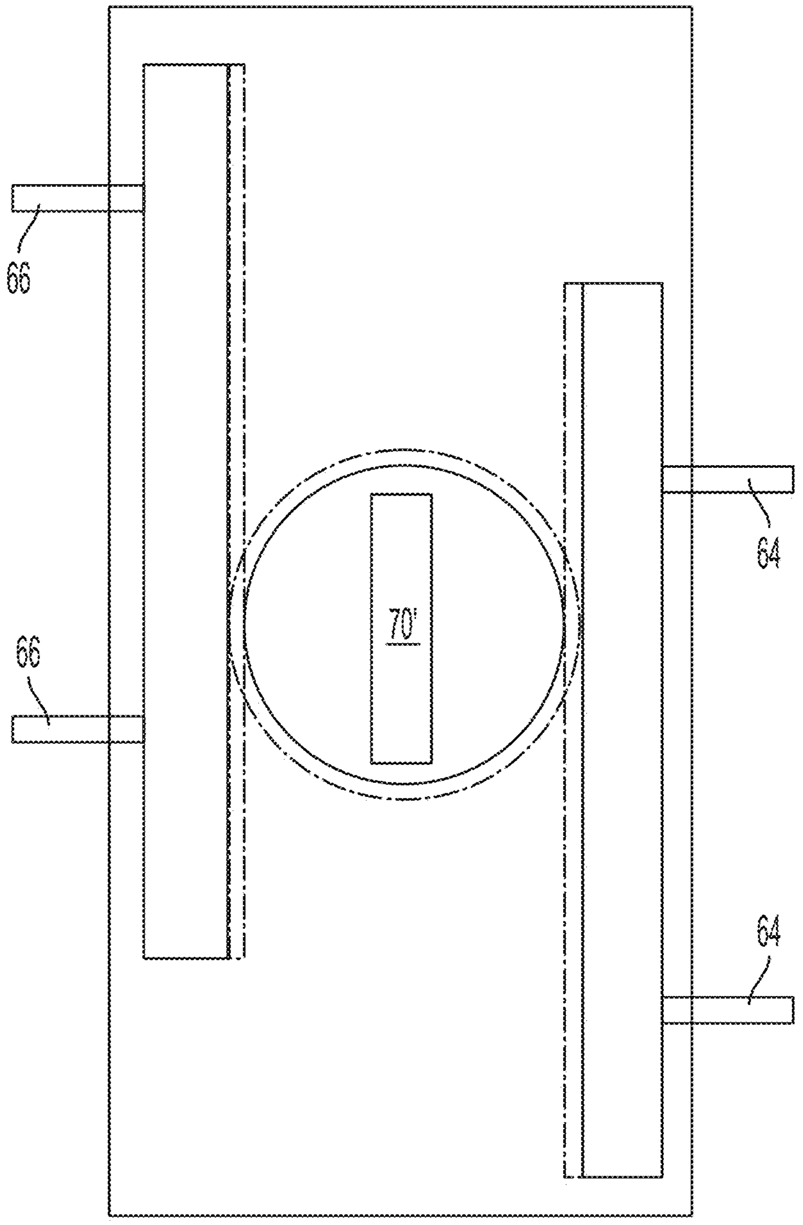
FIG. 4 is a cross-sectional view of the removeable lighting module showing its actuator and locking pins in the unlocked position in which the lighting module could be removed from the trolley.

Considering FIGS. 2A, 2B, 3A, and 3B, the lighting module 60 is mounted into the trolley 30 by positioning the module and twisting the handle 70 so that mounting pins 64 (and a pair of mounting pins 66 at the other side of the lighting module 60, as shown in FIG. 4) engage with and cam inwardly along respective cam raceways 46/48. When the mounting pins 64/66 are fully engaged into the raceways 46/48, the lighting module 60 is locked into place such that a fluid connection is completed between dripless connection pairs 38/138 and 40/140, and such that an electrical connection is completed between pins and electrical contacts 32/132. As shown in FIG. 3A and FIG. 3B, it will be understood that mounting pins 64 are illustrated in their locked position.

As a front side of lighting module 60 is pulled into a rear side of trolley 30, the LED array 62 is aligned with color mixer 61 to deliver light to lens 16. The color mixer 61 has a conical portion 55 and a translucent diffuser 56. When the lighting module 60 is mounted into the trolley 30, light from the LED array 62 is reflected from the inner surface of the conical portion 55 onto the diffuser 56, which blends the colors of the light and illuminates the Fresnel lens 16.

Upon review of the mounting pins and their respective cam raceways it will be appreciated that one pair of pins 66 moves downwardly and the other pair of pins 64 moves upwardly during their inward actuation to mechanically lock lighting module 60 into trolley 30. This helps balance the forces on lighting modules 60 and trolley 30, although it will be understood to one of the skill in the art that many other actuation types, with and without cam actions, with or without pins and the like could be used to achieve a similar, simultaneous, three-phase connection between these components.

Comparing FIGS. 3 and 4, the actuating mechanism used in this example of the exemplary production lamp 10 is depicted in both its locked position 70 (FIG. 3) and its unlocked position 70' (FIG. 4). Note that the mounting pins 64 shown in their locked position in FIG. 3, also move to their unlocked position in FIG. 4, when actuator handle 70 is rotated counterclockwise to unlocked position 70'.

Handle 70/70' is biased in both the locked and unlocked positions, such that actuation requires two manual actions or steps. In this regard, handle 70/70' must be pulled or raised against the bias or detents 72 before it can be rotated between the locked and unlocked positions.

Figure 5A:
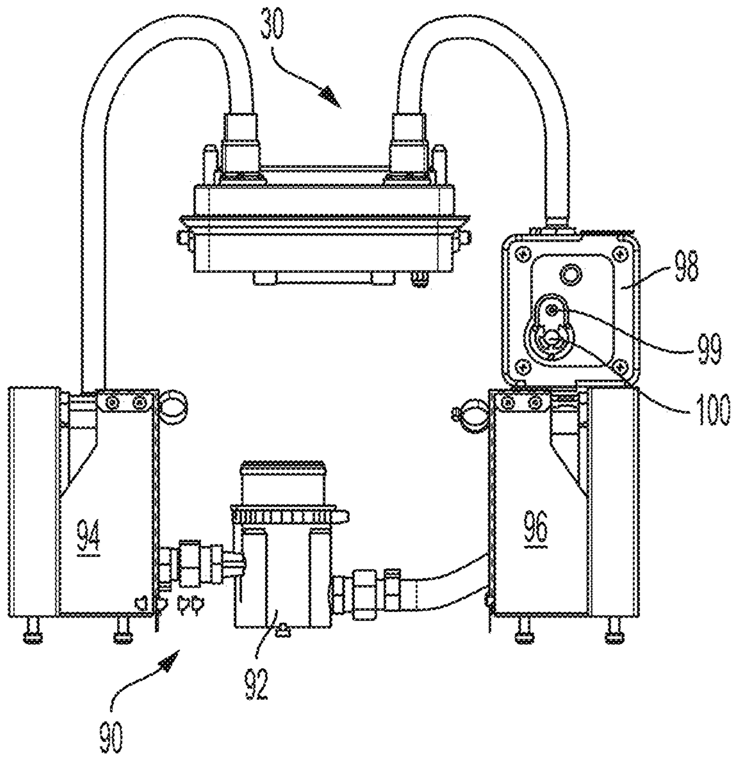
FIG. 5A is a top view of the lighting module trolley of FIGS. 2A-2B along with a liquid cooling system that is connected to the trolley by hoses.
Figure 5B:
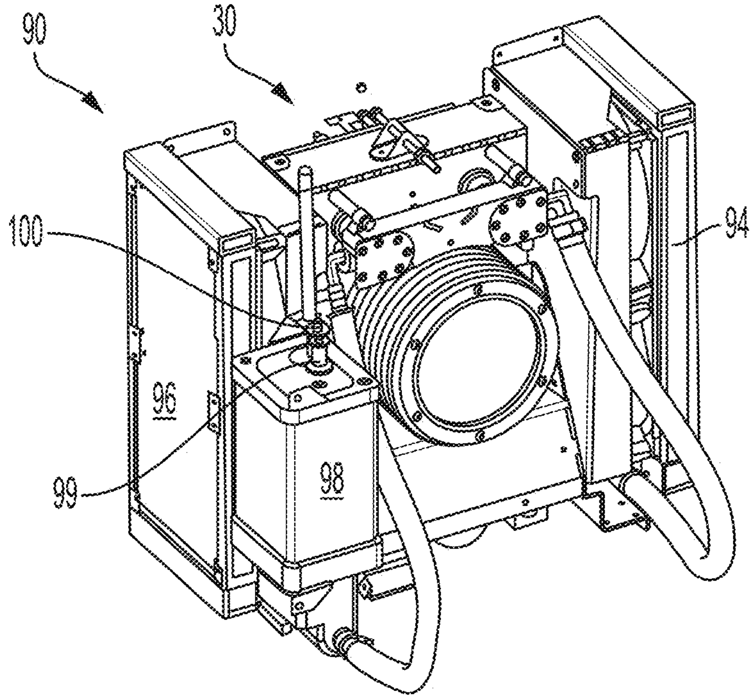
FIG. 5B is a front elevation view of the lighting module trolley and liquid cooling system that are shown in FIG. 4.

FIG. 5A and FIG. 5B depict connections of the trolley 30 to a coolant system 90. The coolant system 90 includes a pump 92, heat rejecting tanks 94, 96, and an expansion tank 98. The expansion tank 98 has a vent 99 that can be operated by a user pressing a button 100. When the button is pressed it moves the vent 99 to an open position. When the button is released it spring-returns to a closed position. The vent 99 is provided because repeated (dis) connection of the dripless connectors 38/138 and 40/140 may introduce air into the coolant system.

Figure 7:
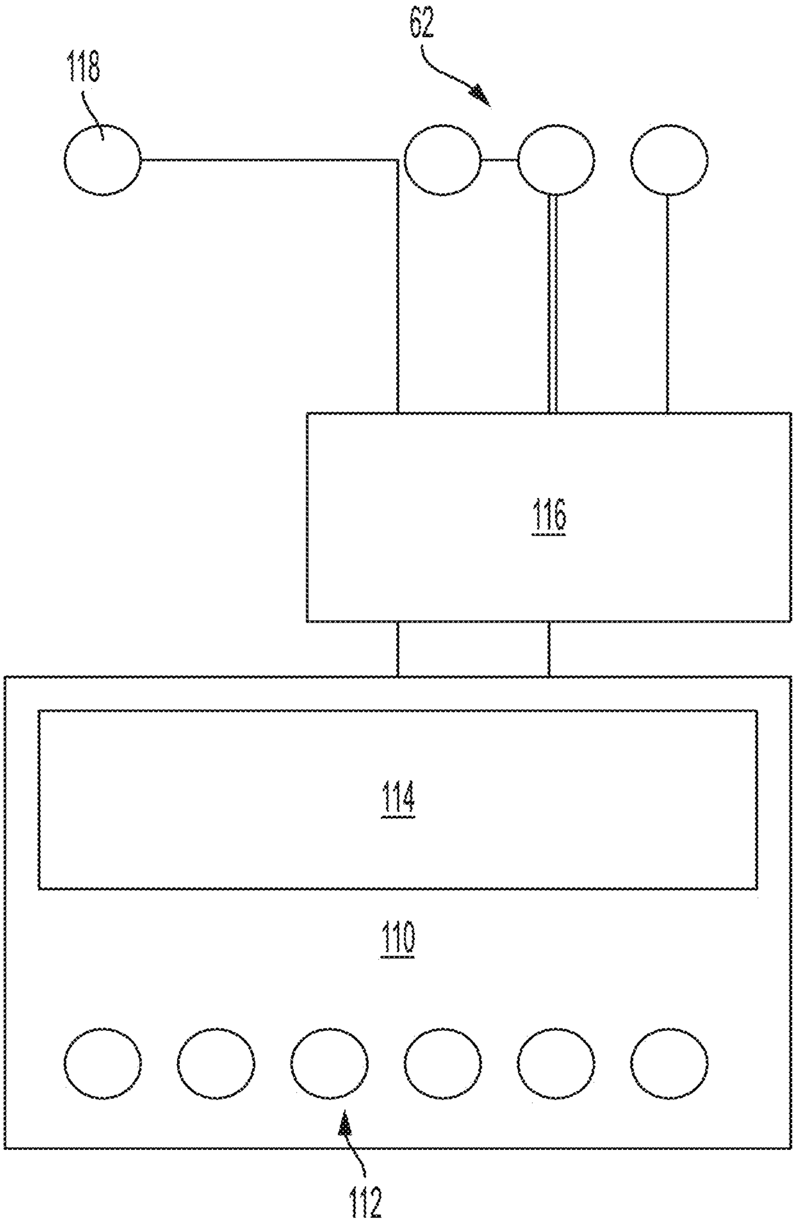
FIG. 7 depicts a schematic of a control unit and LED arrays of the lamp shown in FIG. 1A and FIG. 1B.

In some embodiments, referring to FIG. 7, the lamp 10 may include a control unit 110 (which includes, e.g., a computer processor) that implements various functionality such as selecting which colors of LEDs to illuminate at what intensities for how long or where to position the trolley 30 within the housing 12. The control unit 110 may have buttons 112 and a screen 114 that provide an interface for a user to operate the lamp 10 by selecting LED colors, intensities, durations of lighting, patterns of lighting, trolley position, etc. The control unit 110 may adjust the settings of an LED driver module 116 in response to the user operation of the buttons 112, and may display the settings of the LED driver module 116 at the screen 114. The control unit 110 also may count how many times the removeable lighting module 60 is electrically (dis) connected to the trolley 30. For example, the control unit 110 may include a flip-flop circuit that becomes energized and increments a value in a register, each time that the electrical contacts 32/132 connect with each other. Based on the value in the register, the control unit may signal a user to operate the button 100 for venting the expansion tank 98. For example, the control unit may illuminate a light 118 at the outside of the housing 12. FIG. 1A shows the light 118 adjacent to where the button 100 protrudes out of the housing 12.

Figure 6:
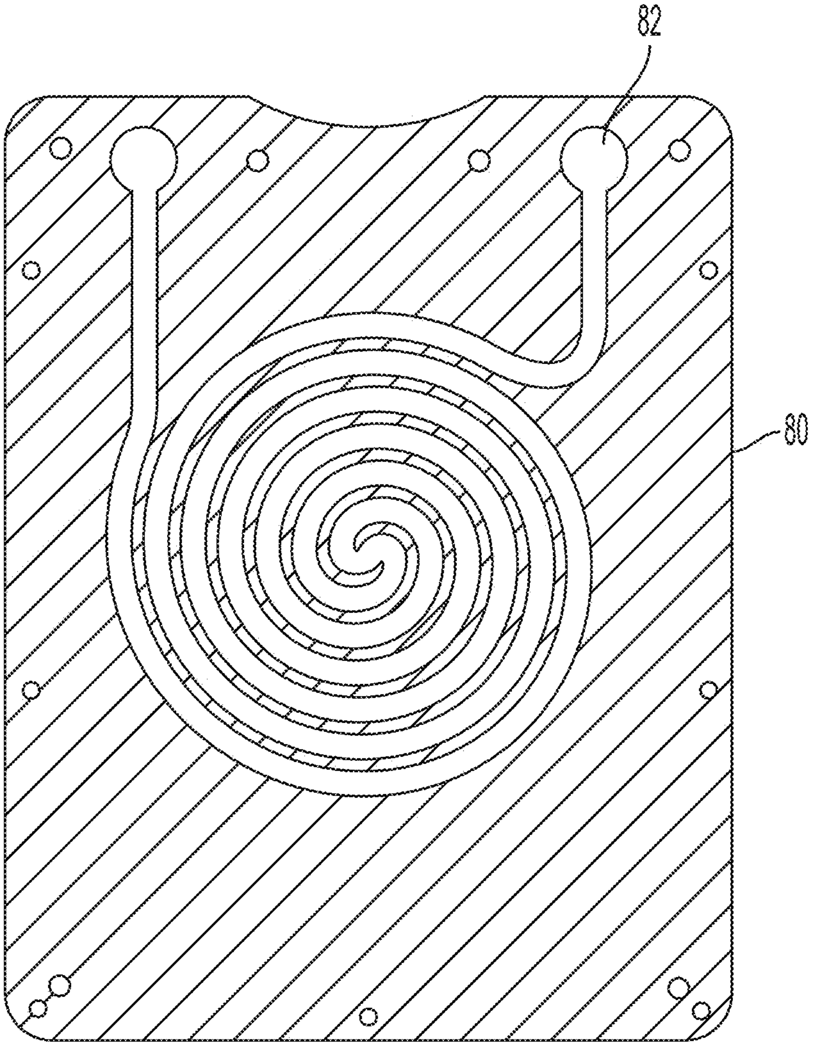
FIG. 6 is a cross-sectional plan view of the cooling fluid passages located behind the LED array in the removable lighting module that is shown in FIGS. 3A-3B.

FIG. 6 is a cross-sectional view of a cold plate 80 that is mounted on the back of lighting module 60. Fluid passage 82 circulates cooling fluid from reservoir 42 in trolley 30 directly behind LED array 62 to reduce color and intensity drift and extend LED life.

What is claimed is:

1. A light-emitting diode lamp comprising:

a housing;

a lens at an end of the housing;

a trolley that is movable within the housing along an axis toward and away from the lens, wherein the trolley comprises:

a color mixer; and a plurality of grooves; and a light engine that is detachably seated in the trolley, wherein the light engine comprises:

a first plurality of light-emitting diodes of a first color;

a plurality of latches that are configured to releasably engage into the grooves of the trolley; and a handle that is mechanically connected with the plurality of latches for engaging the latches into the grooves of the trolley when the handle is moved from a first position to a second position;

wherein engaging the latches of the light engine into the grooves of the trolley seats the light engine into the trolley so that the light-emitting diodes are aligned to emit light into the color mixer.

2. The lamp of claim 1, wherein:

the trolley further comprises a first plurality of electrical connectors;

the light engine further comprises a second plurality of electrical connectors, which are electrically connected with the light-emitting diodes; and engaging the latches into the grooves of the trolley mates the second plurality of electrical connectors against the first plurality of electrical connectors.

3. The lamp of claim 1, wherein:

the light engine further comprises a cold plate that is disposed adjacent to heat-emitting portions of the light-emitting diodes, and two or more cold plate fluid connectors that are in fluid communication with an interior cavity of the cold plate;

the trolley further comprises two or more trolley fluid connectors; and engaging the latches into the grooves of the trolley mates the trolley fluid connectors with the cold plate fluid connectors.

4. The lamp of claim 3, wherein the housing further comprises:

a liquid reservoir;

a pump;

a first hose that connects the pump outlet in fluid communication with a first of the trolley fluid connectors; and a second hose that connects a second of the trolley fluid connectors in fluid communication with the liquid reservoir.

5. The lamp of claim 4, further comprising a vent that is connected in fluid communication with the liquid reservoir.

6. The lamp of claim 5, further comprising an expansion tank that is connected in fluid communication with the liquid reservoir wherein the vent is disposed on the expansion tank.

7. The lamp of claim 5, wherein the vent is operable by a button that spring-returns to a closed position.

8. The lamp of claim 7, wherein:

the trolley further comprises a first plurality of electrical connectors;

the light engine further comprises a second plurality of electrical connectors, which are electrically connected with the light-emitting diodes; and engaging the latches into the grooves of the trolley mates the second plurality of electrical connectors against the first plurality of electrical connectors.

9. The lamp of claim 8, wherein:

the housing further comprises a control unit that sets a value of a counter each time that the electrical connectors are mated and that signals an operator to operate the manually-operable valve in response to the value of the counter.

10. The lamp of claim 9, wherein:

the button protrudes through the housing and the control unit signals the operator by illuminating a light that is adjacent to the button.

11. The lamp of claim 8, wherein at least one of the pluralities of electrical connectors comprises pogo pins.

12. The lamp of claim 1, wherein:

the handle is rotatable with respect to the light engine;

the handle is mechanically connected with the latches by way of a pinion and rack;

the handle can be moved from the first position to the second position by twisting the handle; and the grooves of the trolley are ramped so that engaging the latches with the grooves pulls the light engine into its seated position in the trolley.

13. The lamp of claim 1, wherein the light engine further comprises a second plurality of light-emitting diodes of a second color.

14. A light engine module comprising:

a base;

a first plurality of light-emitting diodes that are set on a first surface of the base;

a plurality of latches that protrude from edges of the base; and a handle that is attached to the base and that is mechanically connected to move the latches from a free position to an engaged position with respect to the base when the handle is moved from a first position to a second position with respect to the base.

15. The module of claim 14, further comprising a cold plate that is attached to a second surface of the base that is opposite to the first surface.

16. The module of claim 15, further comprising cold plate fluid connectors that extend from an interior cavity of the cold plate through the base to protrude from the first surface of the base.

17. The module of claim 14, further comprising electrical connectors at the first surface of the base, wherein the electrical connectors are connected within the body of the lighting module to junctions of the light-emitting diodes.

18. The module of claim 14, wherein:

the handle is rotatable with respect to the base;

the handle is mechanically connected to move the latches by way of a pinion and rack; and the handle is movable from the first position to the second position by twisting the handle.

19. A lamp with removeable LED module, comprising:

a housing;

a lens mounted at one end of said housing;

a removeable lighting module having an array of LEDs mounted to a front surface;

a cooling plate mounted behind the LED array for circulating fluid to dissipate heat from the LED array;

a driver module in said housing for generating variable signals to power LEDs in the array;

a pair of fluid connectors mounted to said cooling plate for connecting it to a source of cooling fluid;

a plurality of movable pins for electrically connecting said removeable lighting module to said driver module; and an actuator mounted in said removeable lighting module which upon actuation disconnects both the source of cooling fluid from said cooling plate and said plurality of pins from the LED array for removal of said lighting module from said housing.

20. The lamp of claim 19 wherein said actuator also mechanically disconnects said removeable lighting module from said housing.

21. The lamp of claim 19 wherein said lens is provided as a Fresnel lens.

22. The lamp of claim 19 wherein said removeable lighting module mounts to a carrier within said housing to move the array of LEDs closer to said lens to make a flood pattern of illumination and farther from said lens to make a spot pattern of illumination.

23. The lamp of claim 22 comprising a transceiver mounted in said housing for receiving data indicative of a desired position of said carrier.

24. The lamp of claim 19 further comprising a transceiver mounted in said housing for receiving data indicative of the variable signals desired to power each of the LEDs in the array.

25. The lamp of claim 19 including a mounting bracket rotatably connected to said housing.

26. The lamp of claim 19 wherein the array of LEDs further comprises at least three different wavelength LEDs and wherein said driver module generates at least three different variable signals to control output intensity of each of the at least three different wavelength LEDs.

27. The lamp of claim 19 wherein the array of LEDs further comprises six different wavelength LEDs and wherein said driver module generates six different variable signals to control output intensity of each of the six different wavelength LEDs.

28. A production lamp with changeable LED module, comprising:

an axial housing;

a lens mounted at one end of said axial housing;

a first LED module having a first array of LEDs mounted to a first plate;

a cooling module mounted in said housing for circulating fluid through the plate to dissipate heat from said array of LEDs;

a driver module generating variable signals to power each of the LEDs in said array;

a pair of dripless fluid connectors mounted to the first plate for connecting said cooling module in fluid communication with the first plate;

a plurality of movable pins mounted in the first plate for electrically connecting said first LED module to said driver module;

a tool-less actuator mounted in said first LED module which upon actuation disconnects both said pair of dripless connectors from said cooling module and said plurality of pins from said driver module for removal of said first LED module from said axial housing;

a second LED module having a second array of LEDs mounted to a second plate; and a second tool-less actuator mounted in said second LED module which upon actuation connects said second LED module into said axial housing.

29. The lamp of claim 28 further comprising:

a second pair of dripless fluid connectors mounted to the second plate for connecting said cooling module in fluid communication with the second plate;

a second plurality of movable pins mounted in the second plate for electrically connecting said second LED module to said driver module; and wherein said second tool-less actuator connects both said second pair of dripless connectors to said cooling module and said second plurality of pins to said driver module for insertion of said second LED module into said axial housing.

30. The lamp of claim 28 wherein the first array of LEDs further comprises at least three different wavelength LEDs and wherein said driver module generates at least three different variable signals to control output intensity of each of the at least three different wavelength LEDs.

31. The lamp of claim 28 further comprising a mobile computing device for transmitting data indicative of the variable signals desired to power each of the LEDs in said first array.

32. The lamp of claim 28 wherein said driver module generates a variable signal to produce white light with a wide color temperature range.

33. The lamp of claim 28 wherein the second array of LEDs further comprises at least three different wavelength LEDs and wherein said second array of LEDs has been calibrated to account for variability of intensity and/or wavelength in order for said driver module to more accurately reproduce a desired output from said lamp than is possible with said first array of LEDs.

* * * * *